United States Patent [19]

Brand et al.

[11] Patent Number: 5,120,701

[45] Date of Patent: Jun. 9, 1992

[54] TITANIUM DIOXIDE COMPACTS, METHOD OF THEIR PRODUCTION AND A CATALYST COATED ON A CARRIER OF TITANIUM DIOXIDE

[75] Inventors: Reinhold Brand; Bernd Engler, both of Hanau; Martin Foerster, Büdingen-Calbach; Werner Hartmann, Babenhausen; Peter Kleinschmit, Hanau; Edgar Koberstein, Alzenau; Johannes Ohmer, Bruchköbel; Rudolf Schwarz, Alzenau-Wasserlos, all of Fed. Rep. of Germany

[73] Assignee: Degussa, Fed. Rep. of Germany

[21] Appl. No.: 676,176

[22] Filed: Mar. 28, 1991

[30] Foreign Application Priority Data

Apr. 19, 1990 [DE] Fed. Rep. of Germany ....... 4012479

[51] Int. Cl.$^5$ .............................................. B01J 21/06
[52] U.S. Cl. ................................................... 502/350
[58] Field of Search .......................... 502/350; 423/610

[56] References Cited

U.S. PATENT DOCUMENTS 5,002,917 3/1991 Deller et al. .................... 502/350 X Primary Examiner—W. J. Shine
Attorney, Agent, or Firm—Cushman, Darby & Cushman

[57] ABSTRACT

Titanium dioxide compacts are produced by intensively mixing pyrogenically produced titanium dioxide in the presence of deionized water with a wetting agent and/or with a base and/or optionally with a binder and/or optionally with an auxiliary deformation agent and/or optionally with a pore former, extruding the mass thus obtained at pressures between 5 and 100 bars to form shaped articles, drying the shaped articles at temperatures between 50° and 120° C. and subsequently calcining the shaped articles in the ambient air at temperatures of 400° to 700° C. for 1 to 5 hours.

6 Claims, No Drawings

TITANIUM DIOXIDE COMPACTS, METHOD OF THEIR PRODUCTION AND A CATALYST COATED ON A CARRIER OF TITANIUM DIOXIDE

The present invention relates to titanium dioxide compacts, a method for producing them and their use as catalytic carriers or catalysts.

BACKGROUND OF THE INVENTION

Pyrogenically produced titanium dioxide is produced by means of high-temperature hydrolysis of a volatile titanium compound, as a rule titanium tetrachloride, in an oxyhydrogen flame. This method is described in German patent 870,242 (1953). The products, which exhibit primarily anatase structure, are hydrophilic, very pure and extremely fine. The primary particles (DIN 53 206) exhibit a spherical form in electron micrographs and diameters of 10-100 nm. A commercially available product exhibits an average primary-particle size of 30 nm. Defined agglomerates (according to DIN 53 206) do not exist. The surface of the particles is smooth and free of pores. There is only an outer, readily accessible surface. The BET specific surface can be between 20 and 100 $m^2/g$, depending on production conditions. The commercial product mentioned exhibits a specific surface of $50 \pm 15$ $m^2/g$.

It is known that powdery, pyrogenically produced titanium dioxide can be used as a titanium-dioxide component or as carrier material in powdery catalytic systems because of its high purity, high specific surface and the lack of pores. (V. Rives-Arnau, G. Munuera, Appl. Surface Sci. 6 (1980) p. 122; N. K. Nag, T. Fransen, P. Mars, J. Cat. 68; 77 (1981); F. Solymcsi, A. Erdohelyi, M. Kocsis, J. Chem. Soc. Faraday Trans 1, 77, 1003 (1981); D. G. Mustard, C. H. Bartholomew, J. Cat. 67, 186 (1981); M. A. Vannice, R. L. Garten, J. Cat. 63, 255 (1980), M. A. Vannice, R. L. Garten, J. Cat. 66, 242 (1980).

If pyrogenically produced titanium dioxide is to be used on an industrial scale in catalytic systems, it is advantageous to convert the powdery product into shaped articles.

Since pyrogenically produced titanium dioxide is especially fine, it is difficult to form it into shaped articles useful as catalytic carriers.

Published German Patent Application DE-OS 31 32 674 (U.S. Pat. No. 4,482,642) teaches a method of producing compacts from pyrogenically produced titanium dioxide in which silica sol is used as binder. Ethanediol, glycerol, erythritols, pentitols or hexitols are used as an auxiliary pressing agent. This method has the disadvantage that an undesirable "covering" occurs in the compacts during large-scale production, that is, an upper layer re-separates from the compacts.

Furthermore, the shaped articles contain, in addition to $TiO_2$, considerable amounts of $SiO_2$, which arises from the binder and influences the catalytic effectiveness.

Published German Patent Application DE-OS 32 17 751 teaches the pressing of pyrogenically produced titanium dioxide in which organic acids or acidicly reacting salts are used as intermediate binder. This method has the disadvantage that the surface nature of the pyrogenically produced titanium dioxide is altered by means of the treatment with organic acids or acidicly reacting salts.

Published German Patent Application DE-OS 38 03 894 teaches a method for the production of titanium dioxide compacts in which pyrogenically produced titanium dioxide and a pore former such as e.g. urea and with water is additionally mixed with a binder such as e.g. kaoline and with an auxiliary tabletting agent such as e.g. wax and is compacted, the mass obtained is dried and comminuted to a powder, the powder pressed to compacts and the compacts obtained are tempered.

The known methods have the important disadvantage that a binder must be used which remains in the compact. This alters the catalytic action of the very pure, pyrogenically produced titanium dioxide.

Old Series German Patent application P 39 13 983 teaches a method of producing titanium dioxide compacts in which pyrogenically produced titanium dioxide is mixed with urea, graphite and water, compacted, the mass obtained dried if necessary at 80° C. to 120° C. and comminuted, then extruded or tabletted and the compacts obtained are tempered at a temperature of 710° C. to 1000° C. for a period of 0.5 to 6 hours.

The titanium dioxide compacts obtained exhibit a grey coloration because of the graphite used during the process, which indicates an incomplete removal of the graphite during the tempering. The remaining amount of graphite can impair the catalytic action considerably.

There is thus an unsolved problem of producing titanium dioxide compacts from pyrogenically produced titanium dioxide which is free of binders and residual graphite content. The desired product would have a high degree of whiteness.

SUMMARY OF THE INVENTION

The present invention provides titanium dioxide compacts with the following physico-chemical characteristics:

| | |
|---|---|
| Outer diameter: | 0.7-25 mm |
| BET surface according to DIN 66 131: | <1-50 $m^2/g$ |
| Pore volume: | 0.01-0.50 ml/g |
| Pore distribution: | at least 90% of the pores in the range $r_{pores}$ = 10-60 nm |
| Crushing strength: | 20-150 N/compact |
| $TiO_2$ phase: | 20-100% rutile; remainder anatase |
| Composition: | >99% $TiO_2$ |
| Degree of whiteness according to Berger: | >35 |

The invention also provides a method for the production of titanium dioxide compacts in which the pyrogenically produced titanium dioxide is intensively mixed in the presence of completely desalinated (deionized) water with a wetting agent and/or optionally with a base and/or optionally with a binder and/or optionally with an auxiliary deformation agent and/or optionally with a pore former, the mass obtained is extruded at pressures between 5 and 100 bars to form shaped articles, the shaped articles are dried at temperatures between 50° and 120° C. and subsequently calcined in the ambient air at temperatures of 400° to 700° C. for 1 to 5 hours.

The following substances can be used as wetting agents: alcohols, glycerol, diethylene glycol or polyethylene oxide.

The following substances can be used as bases, optionally in a mixture: $NH_3$, urotropine, organic amines such as e.g. monoethanolamine.

The following substances can be used as binders: Cellulose derivatives, e.g. carboxymethyl cellulose, methylhydroxyethyl cellulose (tylose) or the unsubstituted celluloses, polyethylene, polypropylene, polyvinyl alcohol, polyacrylamide, polystyrene.

The following substances can be used as auxiliary deformation agent: Lactic acid or other organic acids.

The following substances can be used as pore formers: Pulp (wood pulp), melamine, pentaerythritol.

The wetting agent can be used in amounts of 5 to 50% by weight relative to the total mixture.

The base can be used in amounts of 0 to 20% by weight relative to the total mixture.

The binder can be used in amounts of 0.01 to 15% by weight relative to the total mixture.

The deformation agent can be used in amounts of 0 to 10% by weight relative to the total mixture.

The pore former can be used in amounts of 0 to 20% by weight relative to the total mixture.

In a preferred embodiment of the invention, the pyrogenically produced titanium dioxide is intensively mixed with methylhydroxyethyl cellulose (tylose) and/or optionally CMC and/or optionally polyethylene oxide and/or optionally monoethanolamine and/or optionally $NH_3$ and/or optionally lactic acid and/or optionally polyvinyl alcohol and/or optionally pulp and/or optionally melamine in the presence of deionized water, the mass obtained is extruded at pressures between 5 and 100 bars to form shaped articles, the shaped articles are dried at temperatures between 50° and 120° C. and then they are calcined in the ambient air at temperatures in a range of 400-700° C.

Preferred shaped articles according to the invention have the following characteristics:

| | |
|---|---|
| Outer diameter: | 0.7-25 mm |
| BET surface according to DIN 66 131: | <1-25 $m^2/g$ |
| Pore volume: | 0.01-0.30 $cm^3/g$ |
| Pore distribution: | no pores <10 nm, at least 90% of the pores in the range $r_{pores}$ = 10-60 nm |
| Crushing strength: | 20-150 N/compact |
| $TiO_2$ phase: | >90% rutile; remainder anatase |
| Composition: | >99% $TiO_2$ |
| Degree of whiteness according to Berger: | >35 |

In another preferred form of the invention, the method comprises intensively mixing the pyrogenically produced titanium dioxide with tylose and/or with lactic acid in the presence of deionized water, the homogeneous mixture obtained is extruded without previous, more extensive treatment at pressures between 5 and 100 bars to form shaped articles, the shaped articles obtained are dried at temperatures between 50° and 120° C. and they are subsequently calcined in the ambient air at temperatures of 400° to 800° C. for 1 to 5 hours.

The titanium dioxide compacts of the invention exhibit a cylindrical form because of the extrusion process. Their purity is distinctly greater than is the case for known titanium dioxide compacts which were formed from pyrogenically produced titanium dioxide.

The compacts of the invention can be used either directly as catalysts or as catalytic carriers having a catalytically-active coating thereon after the shaped articles have been impregnated during or after their production with a solution of a catalytically active substance and optionally have been activated by means of a suitable posttreatment.

The compacts of the invention exhibit the following advantages:

They have a high degree of purity without binder residues—recognizable by the high degree of whiteness. They thus offer optimum prerequisites for catalytic applications. These very pure titanium dioxide compacts can be obtained both in rutile and also in anatase modification as a result of the production method of the invention. They have high strengths and high pore volumes in both modifications. The predominant portion of the pores is in the mesopore range. No pores <10 nm are present.

DETAILED DESCRIPTION OF PREFERRED EMBODIMENTS

Examples

The substances used in the examples are characterized as follows:

Polyacrylamide
Firm—Roth, Jansen
Colorless and odorless powder; water-soluble in the cold
$M = 3 \times 10^5 - 6 \times 10^5$ g/mole
Grain size (95%) 0.15-1.0 mm
Bulk weight 725±50 g/l
Polyvinyl alcohol
Firm—Fluka
White powder; slightly soluble in $H_2O$
$D = 1.23-1.30$ g/mole
$M = 15,000-200,000$ g/mole
Thermal decomposition at 180° C.
Polystyrene
Firm—Merck, BASF
$M = 170,000-1$ million g/mole
$D = 1.05$ g/ml
Resistant to acids and alkalis
Polyethylene
Firm—Hoechst
Low-pressure PE
$M = 10,000-6$ million g/mole
$D = 0.945-0.065$ g/ml
$F = 125°-135°$ C.
Crystallinity: 75-85%
Melamine
Firm— Merck
$M = 126.12$ g/mole
$F = 354°$ C. (decomposition)
Readily soluble in $H_2O$ (warm)
Polyethylene oxide
Firm—Jansen $M = 10^5 - 5 \times 10^6$ g/mole
$D = 1.13$ g/mole
Water-soluble
Wood pulp/pulp
Ground pieces of spruce or pinewood
Grain size 0.1-2 mm
Pyrogenically produced titanium dioxide P 25 characterized by the following physico-chemical characteristics is used in the examples as titanium dioxide:

| | | $TiO_2$ P 25 |
|---|---|---|
| Surface according to BET | $m^2/g$ | 50 ± 15 |
| Average size of the primary particles | nm | 30 |
| Stamping density[1] | | |

-continued

|  |  | TiO₂ P 25 |
| --- | --- | --- |
| Normal item | g/l | approx. 150 |
| Drying loss[2] (2 hours at 105° C.) | % | <1.5 |
| Annealing loss[2][5] (2 hours at 1000° C.) | % | <2 |
| pH[3] (in 4% aqueous dispersion) |  | 3-4 |
| SiO₂[6] | % | <0.2 |
| Al₂O₃[6] | % | <0.3 |
| Fe₂O₃[6] | % | <0.01 |
| TiO₂[6] | % | >99.5 |
| HCl[6][8] | % | <0.3 |

[1]according to DIN 53 194
[2]according to DIN 55 921
[3]according to DIN 200
[5]relative to the substance dried 2 hours at 105° C.
[6]relative to the substance annealed 2 hours at 1000°·C.
[8]HCl content is a component of the annealing loss The BET surface is determined according to DIN 66 131 with nitrogen.

The pore volume is determined by calculation from the sum of the micro-, meso- and macropores.

The crushing strength is determined by means of the crushing-strength tester of the firm Erweka, type TBS 28, $N_2$ isotherm and evaluating it according to BET, de Boer and Barret, Joyner, Halenda.

The macropores are determined by means of the Hg intrusion method.

Example 1

| 8 kg titanium dioxide | (100% TiO₂) |
| --- | --- |
| 1 kg 2% tylose solution | (0.25% tylose) | are intensively mixed in a mixer with the addition of deionized water. Then, the mixture is kneaded in a kneading unit 1 hour at a temperature between 40° and 80° C. A plastic kneaded mass is obtained which is extruded at pressures between 5-20 bars. The extruded compacts are finally tempered at 650° C. for 3 hours. The extruded compacts obtained had the following physical characteristics:

| 1 Outer diameter | 0.8 mm |
| --- | --- |
| 2 BET surface according to DIN 66 131 | 20 m²/g |
| 3 Pore volume | 0.25 ml/g |
| 4 Pore distribution | no pores <10 nm (diameter) @; 90% of the pores in the range 20-50 nm |
| 5 Breaking strength | 40 N/extruded compact |
| 6 Composition | 99.5% TiO₂ |
| 7 TiO₂ phase | 91% rutile; remainder anatase |
| 8 Degree of whiteness according to Berger | 70 |

Example 2

| 8.0 kg titanium dioxide | (100% TiO₂) |
| --- | --- |
| 1.0 kg 2% tylose solution | (0.25% tylose) |
| 50 g 90% lactic acid solution | (0.56% lactic acid) | are processed as in Example 1. The extruded compacts obtained had the following physico-chemical characteristics:

| 1 Outer diameter | 0.9 mm |
| --- | --- |
| 2 BET surface according to DIN 66 131 | 18 m²/g |
| 3 Pore volume | 0.23 ml/g |
| 4 Pore distribution | 90% within 20-50 nm |
| 5 Crushing strength | 50 N/extruded compact |
| 6 Composition | >99% TiO₂ |
| 7 TiO₂ phase | 94% rutile; remainder anatase |
| 8 Degree of whiteness according to Berger | 68 |

Example 3

| 8.0 kg titanium dioxide P25 | (100% TiO₂) |
| --- | --- |
| 1.0 kg 2% tylose solution | (0.25% tylose) | are premixed in a mixer with the addition of deionized water. The flowable powder mixture is then supplied to a continuously operating extruder (Continua, Werner & Pfleiderer) and combined in the extruder with sufficient additional, deionized water that a mass which can be extruded at 10-30 bars is produced. The extruded compacts obtained in this manner are dried at 70° C. and calcined at 600° C. for 5 hours. The blanks obtained had the following physical characteristics:

| 1 Outer diameter | 0.8 mm |
| --- | --- |
| 2 BET surface according to DIN 66 131 | 19 m²/g |
| 3 Pore volume | 0.24 ml/g |
| 4 Pore distribution | 90% within 20-50 nm |
| 5 Crushing strength | 35 N/extruded compact |
| 6 Composition | >99.5% TiO₂ |
| 7 TiO₂ phase | 92% rutile; remainder anatase |
| 8 Degree of whiteness according to Berger | 75 |

Example 4

| 8.0 kg titanium dioxide | (100% TiO₂) |
| --- | --- |
| 1.0 kg 2% tylose solution | (0.25 % tylose) |
| 100 g 90% lactic acid solution | (1.13% lactic acid) | are processed to extruded compacts in a manner analogous to Example 3. The blanks obtained have the following physico-chemical characteristics:

| 1 Outer diameter | 0.7 mm |
| --- | --- |
| 2 BET surface according to DIN 66 131 | 17 m²/g |
| 3 Pore volume | 0.22 ml/g |
| 4 Pore distribution | 90% within 10-60 nm |
| 5 crushing strength | 45 N/extruded compact |
| 6 Composition | >99.5% TiO₂ |
| TiO₂ phase | 93% rutile; remainder anatase |
| 8 Degree of whiteness according to Berger | 65 |

Example 5

| 8.0 kg titanium dioxide P25 | (100% TiO₂) |
| --- | --- |
| 90 g carboxymethyl cellulose (CMC) | (1.13% CMC) | are processed to extruded compacts in a manner analogous to Example 1. The blanks are dried at 70° C. and calcined after a step-by-step elevation of the temperature for 4 hrs at 620° C. The blanks obtained have the following phtsuci-chemical characteristics:

| | | |
|---|---|---|
| 1 | Outer diameter | 1.1 mm |
| 2 | BET surface according to DIN 66 131 | 22 m$^2$/g |
| 3 | Pore volume | 0.28 ml/g |
| 4 | Pore distribution | 90% within 10-60 nm |
| 5 | Crushing strength | 26 N/extruded compact |
| 6 | Composition | >99.5% TiO$_2$ |
| 7 | TiO$_2$ phase | 91% rutile; remainder anatase |
| 8 | Degree of whiteness according to Berger | 72 |

Example 6

| | |
|---|---|
| 8.0 kg titanium dioxide | (100% TiO$_2$) |
| 90 g CMC (= carboxymethyl cellulose) | (1.13% CMC) |
| 50 g 90% lactic acid solution | (0.56% lactic acid) | are processed in a manner analogous to Example 1. The blanks obtained have the following physico-chemical characteristics:

| | | |
|---|---|---|
| 1 | Outer diameter | 1.2 mm |
| 2 | BET surface according to DIN 66 131 | 23 m$^2$/g |
| 3 | Pore volume | 0.20 ml/g |
| 4 | Pore distribution | 90% within 10-60 nm |
| 5 | Crushing strength | 39 N/extruded compact |
| 6 | Composition | >99.5% TiO$_2$ |
| 7 | TiO$_2$ phase | 92% rutile; remainder anatase |
| 8 | Degree of whiteness according to Berger | 69 |

Example 7

| | |
|---|---|
| 8.0 kg titanium dioxide P25 | (100% TiO$_2$) |
| 1.0 kg 2% tylose solution | (0.25% tylose) |
| 50 g 90% lactic acid solution | (0.56% lactic acid) |
| 1.7 kg 15 NH$_3$ solution | (3.19% NH$_3$) | are premixed in an intensive mixer with the addition of deionized water; the mixture is then kneaded in a kneader with the further addition of water between 40°-80° C. 1-2 hours. The kneaded mass is extruded via a single screw extruder. The extruded compacts are dried at 70° C. and calcined:
a) at 650° C. for 2 hours,
b) at 650° C. for 5 hours or
c) after a step-by-step elevation of the temperature at 620° C. for 4 hours.

The blanks obtained have the following physico-chemical characteristics:

(a)
| | | |
|---|---|---|
| 1 | Outer diameter | 3.0 mm |
| 2 | BET surface according to DIN 66 131 | 20 m$^2$/g 20 m2/g |
| 3 | Pore volume | 0.18 ml/g |
| 4 | Pore distribution | 90% within 10-60 nm |
| 5 | Crushing strength | 80 N/extruded compact |
| 6 | Composition | 99% TiO$_2$ |
| 7 | TiO$_2$ phase | 91% rutile; remainder anatase |
| 8 | Degree of whiteness according to Berger | 68 |

(b)
| | | |
|---|---|---|
| 1 | Outer diameter | 3.0 mm |
| 2 | BET surface according to DIN 66 131 | 13 m$^2$/g |
| 3 | Pore volume | 0.17 ml/g |
| 4 | Pore distribution | 90% within 10-60 nm |
| 5 | Crushing strength | 100 N/extruded compact |
| 6 | Composition | >99% TiO$_2$ |
| 7 | TiO$_2$ phase | 99% rutile; remainder anatase |
| 8 | Degree of whiteness according to Berger | 68 |

(c)
| | | |
|---|---|---|
| 1 | Outer diameter | 3.0 mm |
| 2 | BET surface according to DIN 66 131 | 16 m$^2$/g |
| 3 | Pore volume | 0.24 ml/g |
| 4 | Pore distribution | 90% within 10-60 nm |
| 5 | Crushing strength | 74 N/extruded compact |
| 6 | Composition | >99% TiO$_2$ |
| 7 | TiO$_2$ phase | 85% rutile; remainder anatase |
| 8 | Degree of whiteness according to Berger | 68 |

Example 8

| | |
|---|---|
| 8.0 kg titanium dioxide P25 | (100% TiO$_2$) |
| 1.0 kg 2% tylose solution | (0.25% tylose) |
| 100 g polyethylene oxide | (1.25% polyethylene oxide) | are kneaded with the addition of deionized water in a kneading unit 4-8 hours. The plastic mass obtained in this manner is extruded at pressures between 10-30 bars, dried at 70° C. and calcined during 4 hours after a step-by-step elevation of temperature to 620° C. The blanks obtained have the following physico-chemical characteristic data:

| | | |
|---|---|---|
| 1 | Outer diameter | 1.5 mm |
| 2 | BET surface according to DIN 66 131 | 19 m$^2$/g |
| 3 | Pore volume | 0.32 ml/g |
| 4 | Pore distribution | 90% within 10-60 nm |
| 5 | Crushing strength | 55 N/extruded compact |
| 6 | Composition | >99% TiO$_2$ |
| 7 | TiO$_2$ phase | 75% rutile; remainder anatase |
| 8 | Degree of whiteness according to Berger | 68 |

Example 9

| | |
|---|---|
| 8.0 kg titanium dioxide P25 | (100% TiO$_2$) |
| 1.0 kg 2% tylose solution | (0.25% tylose) |
| 100 g polyethylene oxide | (1.25% polyethylene oxide) |
| 50 g 90% lactic acid solution | (0.56% lactic acid) | are processed in the manner of Example 8. The blanks obtained have the following physico-chemical characteristics:

| | | |
|---|---|---|
| 1 | Outer diameter | 5.0 mm |

| | | |
|---|---|---|
| 2 | BET surface according to DIN 66 131 | 19 m²/g |
| 3 | Pore volume | 0.26 ml/g |
| 4 | Pore distribution | 90% within 10–60 nm |
| 5 | Crushing strength | 112 N/extruded compact |
| 6 | Composition | >99% TiO₂ |
| 7 | TiO₂ phase | 80% rutile: remainder anatase |
| 8 | Degree of whiteness according to Berger | 68 |

Example 10

| | |
|---|---|
| 8.0 kg titanium dioxide P25 | (100% TiO₂) |
| 1.0 kg 2% tylose solution | (0.35% tylose) |
| 100 g polyethylene oxide | (1.25% polyethylene oxide) |
| 1.7 kg 15% NH₃ solution | (3.19% NH₃) | are processed in the manner of Example 8. The blanks obtained exhibit the following physico-chemical charactersitics:

| | | |
|---|---|---|
| 1 | Outer diameter | 1.0 mm |
| 2 | BET surface according to DIN 66 131 | 24 m²/g |
| 3 | Pore volume | 0.34 ml/g |
| 4 | Pore distribution | 90% within 10–60 nm |
| 5 | Crushing strength | 30 N/extruded compact |
| 6 | Composition | >99% TiO₂ |
| 7 | TiO₂ phase | 65% rutile; remainder anatase |
| 8 | Degree of whiteness according to Berger | 73 |

Example 11

| | |
|---|---|
| 8.0 kg titanium dioxide | (100% TiO₂) |
| 100 g carboxymethyl cellulose (CMC) | (1.25% CMC) |
| 300 g polyethylene oxide (PEO) | (3.75% PEO) |
| 2.5 kg 15% NH₃ solution | (4.69% NH₃) | are processed in the manner disclosed in Example 8. The blanks obtained exhibit the following physico-chemical characteristics:

| | | |
|---|---|---|
| 1 | Outer diameter | 2.00 mm |
| 2 | BET surface according to DIN 66 131 | 20 m²/g |
| 3 | Pore volume | 0.23 ml/g |
| 4 | Pore distribution | 90% within 10–60 nm |
| 5 | Crushing strength | 85 N/extruded compact |
| 6 | Composition | >99% TiO₂ |
| 7 | TiO₂ phase | 75% rutile; remainder anatase |
| 8 | Degree of whiteness according to Berger | 71 |

Example 12

| | |
|---|---|
| 8.0 kg titanium dioxide P25 | (100% TiO₂) |
| 100 g carboxymethyl cellulose (CMC) | (1.25% CMC) |
| 100 g polyethylene oxide | (1.25% PEO) |
| 1.5 kg 15% NH₃ solution | (2.81% NH₃) |
| 700 g monoethanol amine | (8.75% monoethanol amine) |
| 50 g 90% lactic acid | (0.56% lactic acid) | are processed in the manner described in Example 8. The blanks obtained exhibit the following physico-chemical characteristics:

| | | |
|---|---|---|
| 1 | Outer diameter | 3.0 mm |
| 2 | BET surface according to DIN 66 131 | 25 m²/g |
| 3 | Pore volume | 0.32 ml/g |
| 4 | Pore distribution | 90% within 10–60 nm |
| 5 | Crushing strength | 45 N/extruded compact |
| 6 | Composition | >99% TiO₂ |
| 7 | TiO₂ phase | 55% rutile; remainder anatase |
| 8 | Degree of whiteness according to Berger | 75 |

Example 13

| | |
|---|---|
| 8.0 kg titanium dioxide P25 | (100% TiO₂) |
| 2.0 kg 2% tylose solution | (0.5% tylose) |
| 300 g polyethylene oxide | (3.75% PEO) |
| 1.0 kg monoethanol amine | (12.5% monoethanol amine) |
| 500 g pulp | (6.25% pulp) | are processed in the manner described in Example 8. The blanks obtained have the following physico-chemical characteristics:

| | | |
|---|---|---|
| 1 | Outer diameter | 3.0 mm |
| 2 | BET surface according to DIN 66 131 | 43 m²/g |
| 3 | Pore volume | 0.40 ml/g |
| 4 | Pore distribution | 30% within 10–60 nm |
| 5 | Breaking strength | 35 N/extruded compact |
| 6 | Composition | >99% TiO₂ |
| 7 | TiO₂ phase | 25% rutile; remainder anatase |
| 8 | Degree of whiteness according to Berger | 72 |

Example 14

| | |
|---|---|
| 8.0 kg titanium dioxide P25 | (100% TiO₂) |
| 1.0 kg 2% tylose solution | (0.25% tylose) |
| 100 g monoethanol amine | (12.5% monoethanol amine) | are mixed in an intensive mixer with the addition of deionized water and combined in a kneader with 50 g 90% lactic acid (0.56% lactic acid)
100 g polyvinyl alcohol (1.35% polyvinyl alcohol)
300 g melamine (3.75% melamine)

and kneaded with the addition of deionized water for 2 hours until a plastic mass has been produced. This mass is extruded at pressures between 20–30 bars. The extruded compacts are dried at 70° C. and then calcined 5 hours at 500° C. The blanks obtained have the following physico-chemical characteristics:

| | | |
|---|---|---|
| 1 | Outer diameter | 3.0 mm |
| 2 | BET surface according to DIN 66 131 | 47 m²/g |
| 3 | Pore volume | 0.50 ml/g |
| 4 | Pore distribution | 90% within 10–60 nm |

-continued

| 5 Breaking strength | 40 N/extruded compact |
| 6 Composition | >99% TiO$_2$ |
| 7 TiO$_2$ phase | 20% rutile; remainder anatase |
| 8 Degree of whiteness according to Berger | 68 |

What we claim is:

1. Titanium dioxide compacts having the following physico-chemical characteristics:

| Outer diameter: | 0.7–25 mm |
| BET surface according to DIN 66 131: | <1–50 m$^2$/g |
| Pore volume: | 0.01–0.50 ml/g |
| Pore distribution: | at least 90% of the pores in the range r$_{pores}$ = 10–60 nm |
| Crushing strength: | 20–150 N/compact |
| TiO$_2$ phase: | 20–100% rutile; remainder anatase |
| Composition: | >99% TiO$_2$ |
| Degree of whiteness according to Berger: | >35 |

2. A method for the production of titanium dioxide compacts having the following physico-chemical characteristics:

| Outer diameter: | 0.7–25 mm |
| BET surface according to DIN 66 131: | <1–50 m$^2$/g |
| Pore volume: | 0.01–0.50 ml/g |
| Pore distribution: | at least 90% of the pores in the range r$_{pores}$ = 10–60 nm |
| Crushing strength | 20–150 N/compact |
| Composition: | >99% TiO$_2$ |
| Degree of whiteness according to Berger: | >35, | said method comprising intensively mixing pyrogenically produced titanium dioxide in the presence of deionized water with a wetting agent and/or with a base and/or optionally with a binder and/or optionally with an auxiliary deformation agent and/or optionally with a pore former, extruding the mass thus obtained at pressures between 5 and 100 bars to form shaped articles, drying the shaped articles at temperatures between 50° and 120° C. and subsequently calcining the shaped articles in ambient air at temperatures of 400° to 700° C. for 1 to 5 hours.

3. A method for the production of titanium dioxide compacts according to claim 2 in which the pyrogenically produced titanium dioxide is intensively mixed with methylhydroxyethyl cellulose (tylose) and/or carboxymethyl cellulose and/or polyethylene oxide and/or monoethanolamine and/or NH$_3$ and/or lactic acid and/or polyvinyl alcohol and/or pulp and/or melamine in the presence of deionized water, the mass obtained is extruded at pressures between 5 and 100 bars to form shaped articles, the shaped articles are dried at temperature between 50° and 120° C. and then calcined in the ambient air at temperatures in a range of 400°–700° C.

4. Titanium dioxide compacts having the following physico-chemical characteristics:

| Outer diameter: | 0.7–25 mm |
| BET surface according to DIN 66 131: | <1–25 m$^2$/g |
| Pore volume: | 0.01–0.30 cm$^3$/g |
| Pore distribution: | no pores < 10 nm, at least 90% of the pores in the range r$_{pores}$ = 10–60 nm |
| Crushing strength: | 20–150 N/compact |
| TiO$_2$ phase: | >90% rutile; remainder anatase |
| Composition: | >99% TiO$_2$ |
| Degree of whiteness according to Berger: | >35 |

5. A method for the production of titanium dioxide compacts having the following physico-chemical characteristics:

| Outer diameter: | 0.7–25 mm |
| BET surface according to DIN 66 131 | <1–25 m$^2$g |
| Pore distribution: | no pores < 10 nm, at least 90% of the pores in the range r$_{pores}$ = 10–60 nm |
| Crushing strength: | 20–150 N/compact |
| TiO$_2$ phase | 90% rutile; remainder anatase |
| Composition: | >99% TiO$_2$ |
| Degree of whiteness according to Berger: | >35, | said method comprising intensively mixing pyrogenically produced titanium dioxide with tylose or with lactic acid in the presence of deionized water, extruding the homogeneous mixture obtained without previous, more extensive treatment at pressures of 5 to 100 bars to form shaped articles, drying the shaped articles at temperatures between 50° and 120° C. and subsequently calcining the shaped articles in the ambient air at temperatures of 400° to 800° C. for 1 to 5 hours.

6. A catalyst carrier comprising a titanium dioxide compact according to claim 1 or 4 and a catalytically-active coating thereon.

* * * * *